United States Patent
Mott (10) Patent No.: US 6,644,463 B2
(45) Date of Patent: Nov. 11, 2003

(54) CLEATED CONVEYOR BELT AND CLEANING ASSEMBLY

(75) Inventor: George T. Mott, Alburtis, PA (US)

(73) Assignee: Asgco Manufacturing, Inc., Allentown, PA (US)

( * ) Notice: Subject to any disclaimer, the term of this patent is extended or adjusted under 35 U.S.C. 154(b) by 0 days.

(21) Appl. No.: 10/079,726

(22) Filed: Feb. 21, 2002

(65) Prior Publication Data

US 2003/0155211 A1 Aug. 21, 2003

(51) Int. Cl.[7] ............................................. B65G 45/18
(52) U.S. Cl. ..................................... 198/496; 15/256.52
(58) Field of Search ................................. 198/496, 498; 15/256.5, 256.52

(56) References Cited

U.S. PATENT DOCUMENTS

| | | | | |
|---|---|---|---|---|
| 669,821 A | * | 3/1901 | Derdeyn ................. | 198/496 X |
| 2,083,864 A | * | 6/1937 | Puckett .................... | 198/496 |
| 2,512,073 A | * | 6/1950 | Sandberg ................ | 198/496 X |
| 2,730,770 A | * | 1/1956 | Higginbutham et al. . | 15/256.52 |
| 2,858,576 A | * | 11/1958 | Rose ....................... | 15/256.52 |
| 3,047,133 A | | 7/1962 | Searles | |
| 3,430,758 A | | 3/1969 | Searles | |
| 4,054,404 A | * | 10/1977 | Marsh ................... | 198/498 X |
| 4,664,719 A | * | 5/1987 | Mizutani .................. | 198/496 |
| 4,907,690 A | * | 3/1990 | Spohn ..................... | 198/498 |
| 4,934,513 A | * | 6/1990 | Kirkpatrick et al. ........ | 198/496 |
| 5,400,897 A | * | 3/1995 | Doyle ...................... | 198/496 |
| 5,497,872 A | * | 3/1996 | Pennino .................. | 198/496 X |

FOREIGN PATENT DOCUMENTS

| | | | | |
|---|---|---|---|---|
| DE | 2148299 | * | 4/1973 | ................. 198/496 |
| SU | 680455 | * | 8/1979 | ................. 198/496 |

* cited by examiner

Primary Examiner—James R. Bidwell
(74) Attorney, Agent, or Firm—Roger W. Herrell, Esq.; Dann, Dorfman, Herrell and Skillman (57) ABSTRACT

A conveyor belt assembly is provided with a cleated type conveyor belt or other belt having raised projections on its carrying surface, and a cleaning mechanism adapted to clean the belt. The cleaning mechanism has a rotatable shaft and a plurality of flexible disks mounted on the shaft that engage the surface of the conveyor belt to clean the belt as the belt moves past the cleaning mechanism. Each disk has a plurality of flexible fingers that extend outwardly from the perimeter of the disk. The fingers engage around the cleats or raised projections on the moving conveyor belt to remove residual material adhering to the belt.

28 Claims, 6 Drawing Sheets

CLEATED CONVEYOR BELT AND CLEANING ASSEMBLY

FIELD OF THE INVENTION

The present invention relates generally to conveyor belts, and more specifically to a cleaning mechanism for conveyor belt assemblies.

BACKGROUND

A variety of conveyor belt systems are known in the art that employ a cleaning mechanism to remove material residue from the conveyor belt. For example, U.S. Pat. No. 3,430,758 discloses a conveyor belt assembly having a series of flexible disks mounted in proximity to the surface of a conveyor belt. As the conveyor belt moves past the flexible disks, the disks engage the surface of the belt and remove material that adheres to the belt.

In some conveyor belt assemblies, the belt has cleated or "chevron" type members thereon to facilitate transport of materials. Cleated belts typically include a series of raised projections or cleats on the belt that extend from the surface of the belt. The cleats may be arranged in a "V" shaped pattern on the belt, as the name "chevron" suggests, or in a number of other patterns. The cleats are used to hold materials that ordinarily slips or moves on the smooth belt surfaces or to facilitate transport of carry materials on an inclined belt. The irregular surface of cleated or chevron belts is frequently difficult to clean. In particular, material residue that adheres to the belt in the vicinity of the cleats is difficult to reach and dislodge with conventional belt cleaners.

SUMMARY OF THE INVENTION

In light of the foregoing, the present invention provides a conveyor belt assembly having a cleaning mechanism adapted to particularly clean cleated type belts. More specifically, the conveyor belt system preferably has a moving cleated type belt to carry and discharge material to a discharge area. The present conveyor belt system further includes a cleaning mechanism operable to remove residual material that adheres to the belt after the belt leaves the discharge area. The cleaning mechanism comprises one or more shafts positioned in proximity to the conveyor belt. A series of cleaning disks are disposed on each shaft and are configured to engage the surface of the belt to remove residual material. The shafts may be adjustably positioned in proximity to the belt to adjust the amount of engagement between the cleaning disks and the belt.

Each disk preferably has a central hub and a portion that extends radially outwardly from the hub. The outer peripheral edge of each disk is formed with a plurality of radial slits cut inwardly in the periphery of the disk. The slits form a plurality of finger-like projections around the periphery of each disk that are adapted to engage the surfaces of the cleated belt and remove residual material from the belt surface. The peripheral edge of each disk is made of a resilient material and is preferably oriented to engage the belt at an angle to flex the fingers in response to contact with the surface of the belt.

DESCRIPTION OF THE DRAWINGS

The foregoing summary as well as the following description will be better understood when read in conjunction with the figures in which.

DETAILED DESCRIPTION

Figure 1:
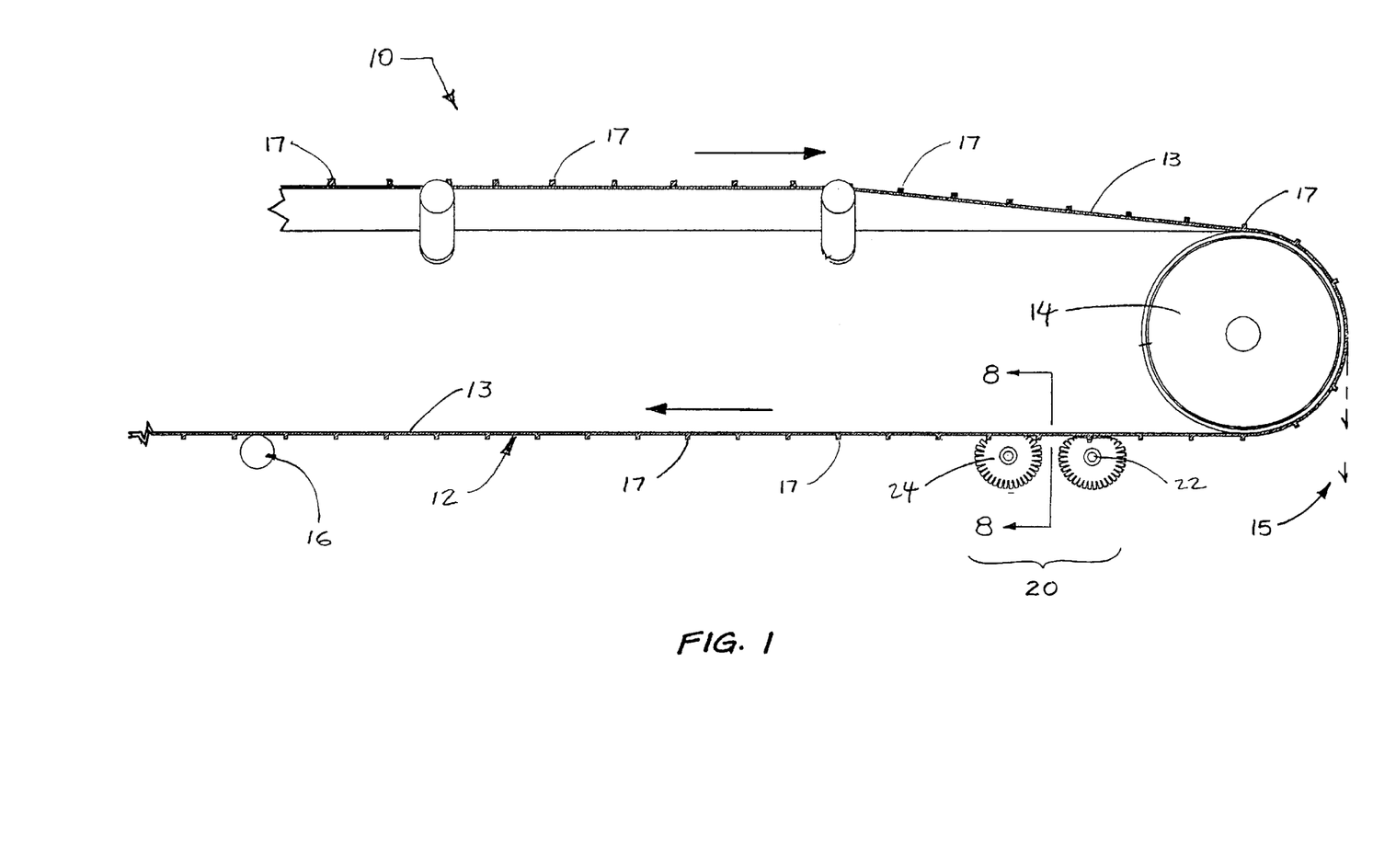
FIG. 1 is a fragmentary side elevational view of a cleaning mechanism and cleated conveyor belt system in accordance with the present invention.

Referring to FIGS. 1–9 in general, and to FIG. 1 specifically, a conveyor belt system 10 is shown in accordance with the present invention. The conveyor belt system 10 comprises a cleated or chevron conveyor belt 12 having a surface 13 configured to carry material. The belt 12 has a series of raised projections or cleats 17 that extend from the carrying surface 13 on the belt. The conveyor belt 12 is disposed around a head pulley 14 which inverts the belt at a discharge location generally designated 15. The system 10 also includes a return pulley 16 and a cleaning mechanism generally designated 20 configured to remove material residue from the belt 12. The conveyor belt system 10 includes many components that are common in conventional conveyor belt assemblies. These components are well known in the art and need not be described at length to understand the present invention. A more detailed description of such components may be found in U.S. Pat. No. 3,047,133 and U.S. Pat. No. 3,430,758, the contents of which are incorporated herein by reference.

The cleaning mechanism 20 is configured to remove loose material, moisture and other residues that may adhere to the carrying surface 13 and cleats 17 on the belt 12. The cleaning mechanism is operable to remove residues from the conveyor belt as the belt travels between pulleys during operation of the belt. FIG. 1 shows the cleaning mechanism 20 installed after the head pulley 14 and discharge location 15. It will be understood that the cleaning mechanism 20 may be installed at any location along the conveyor belt system 10, or it may be installed in multiple locations in the conveyor belt system as desired for effective cleaning of the belt.

Figure 2:
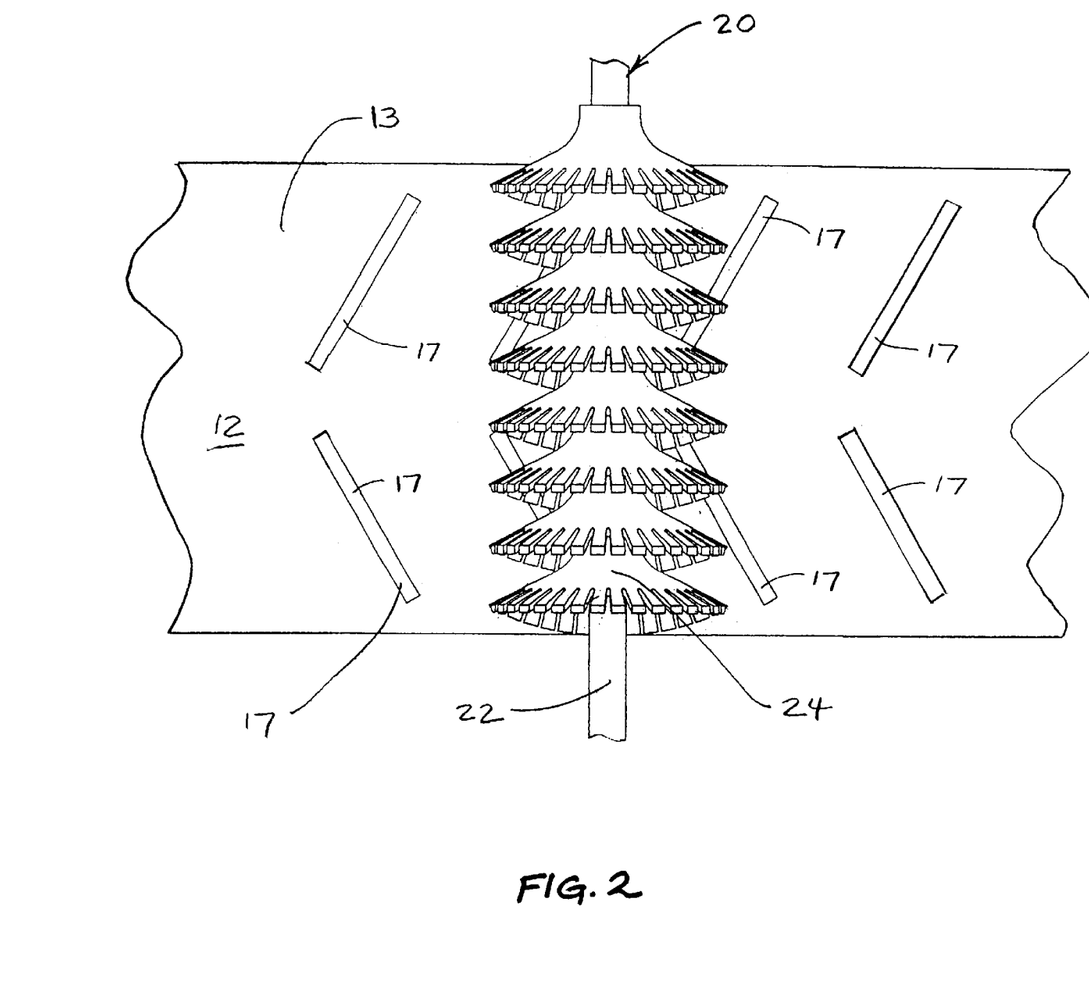
FIG. 2 is an enlarged fragmented bottom perspective view of the cleaning mechanism with the conveyor belt of FIG. 1.
Figure 3:
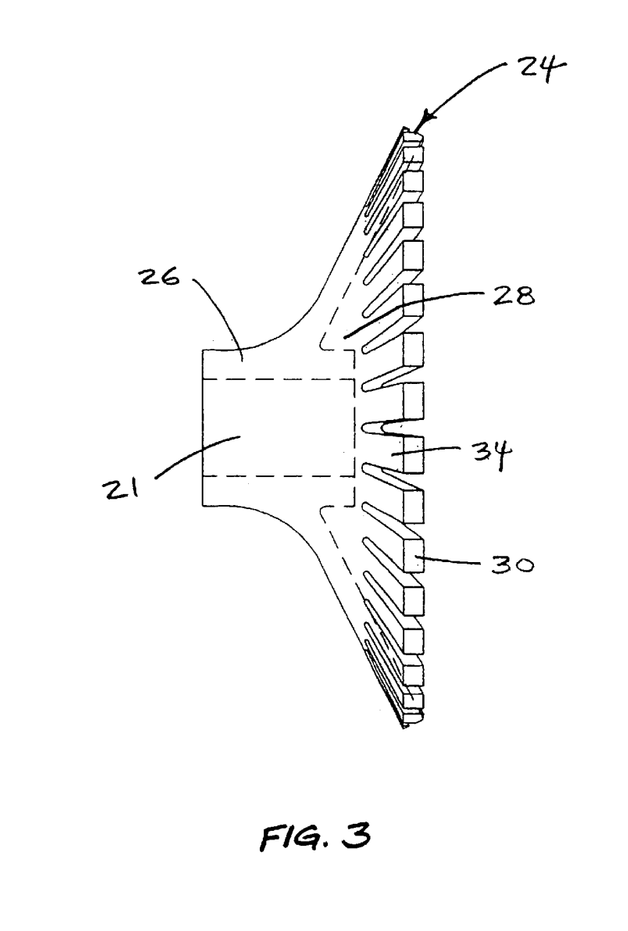
FIG. 3 is an enlarged side elevation view of the cleaning disk of FIG. 2.
Figure 4:
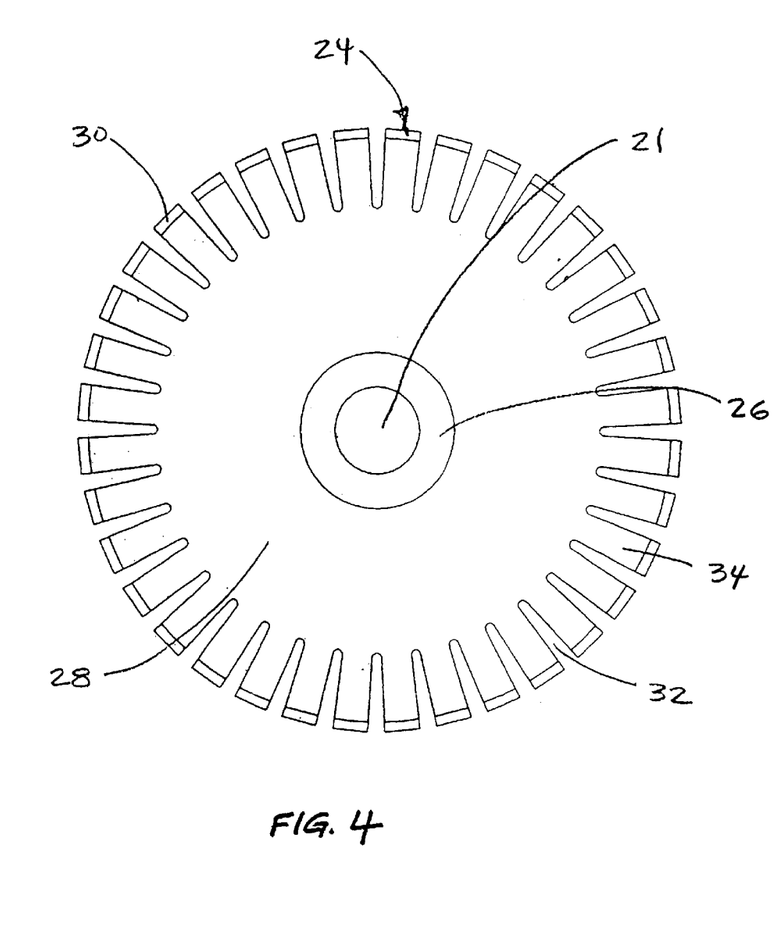
FIG. 4 is an enlarged plan view of the cleaning disk shown in FIG. 3.

Referring now to FIGS. 2–4, the cleaning mechanism 20 comprises a cylindrical shaft 22 and a plurality of resilient conical disks 24 coaxially mounted on the shaft. The disks may be formed of any resilient flexible material, such as rubber or an elastomeric polymer. Each disk 24 comprises a cylindrical center portion or hub 26 and a generally outwardly flared portion 28 that extends radially outwardly from the center hub in a bowl shaped configuration, as shown in FIGS. 3 and 4. A cylindrical bore 21 extends through the hub 26 and is axially aligned with the axis of the hub, as shown in FIG. 3. The bore 21 is adapted to allow insertion of the shaft 22 through the hub 26 and facilitate mounting of the disk 24 on the shaft. The disks are mounted on the shaft 22 in a manner to be securely fixed to the shaft and preferably incapable of rotation relative to the shaft.

The disk shown in FIGS. 3 and 4 has its outwardly extending portion 28 generally conical shaped or providing a concave structure. The cone shaped body 28 of each disk 24 extends radially outwardly from the hub 26 to a terminal edge 30. The terminal edge 30 has a series of intermittent radial slits 32 partially cut into the cone shaped body 28 and oriented toward the center axis of the disk 24. More specifically, the intermittent slits 32 penetrate through a fraction of the cone shaped body 28 and extend toward the central hub 26 so as to form a plurality of resilient flexible fingers 34 around the periphery of the body.

Figure 5:
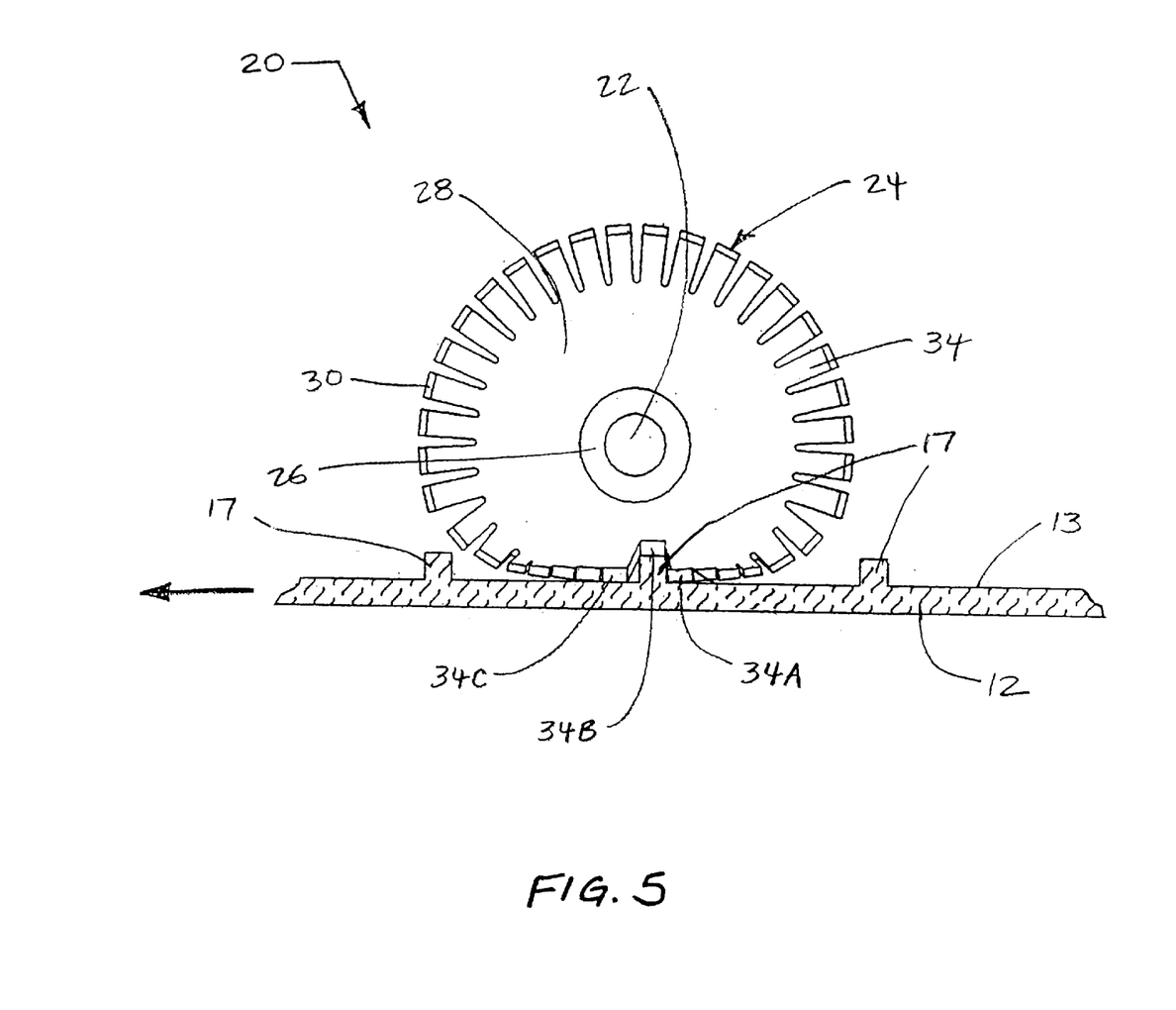
FIG. 5 is an enlarged fragmenting inverted side elevational view of the cleaning disk and conveyor belt system of FIG. 1.
Figure 6:
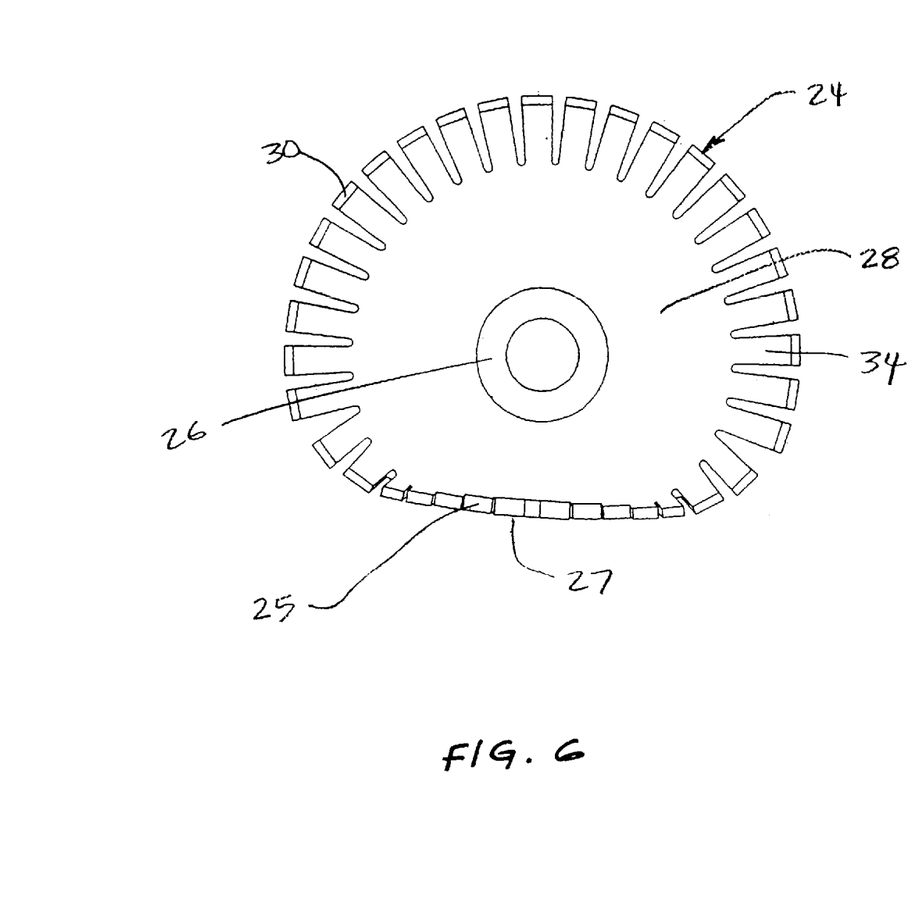
FIG. 6 is an enlarged elevational plan view of the cleaning disk of FIG. 4, but with showing the disk in a deflected state as when contacting the belt of FIG. 1.
Figure 7:
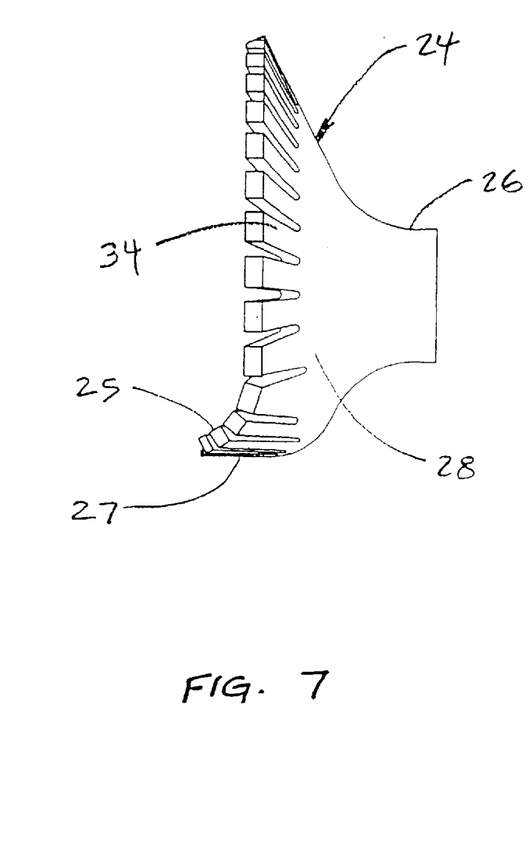
FIG. 7 is a side elevational view of the cleaning disk of FIG. 6.

Referring now to FIGS. 5, 6, 7 and 8, the cleaning assembly 20 is installed in proximity to the chevron conveyor belt 12 so as to engage the belt during operation. More specifically, the shaft 22 is mounted in proximity to the conveyor belt so as to hold the disks 24 in engagement against the moving surface 13 of the conveyor belt. The disks 24 are mounted in such a position and proximity to the conveyor belt as to be partially deflected by the moving conveyor belt. In particular, the body 28 of each disk 24 is configured to partially deflect into a generally flat orientation on the belt 12. FIGS. 6 and 7 illustrate the shape of a disk 24 having a deflected or flattened portion 25. The deflected portion 25 of each disk 24 has an underside 27 that frictionally engages the carrying surface 13 of the conveyor belt 12. As such, the disks 24 are configured to rotate with the shaft 22 in response to frictional forces transferred by the moving conveyor belt.

The resilient flexible fingers 34 on each disk 24 are configured to deflect with the disk body 28 as the disk engages the belt 12. The resilient flexible fingers 34 are individually displaceable on the disk to conformingly engage edges of the cleats 17 and the carrying surface between the cleats as shown in FIG. 5, wherein disk 24 on the cleaning mechanism 20 is shown in engagement with the cleated conveyor belt 12. The direction of the moving conveyor belt 12 is indicated by the arrow. Three flexible fingers 34A, 34B and 34C are shown in engagement with the belt 12 in the vicinity of a cleat 17. Finger 34A is shown in engagement with carrying surface 13 at a point immediately preceding the cleat. The finger 34A contacts both the carrying surface 13 and a side edge of the cleat 17. Finger 34B is shown engaging a top edge of the cleat 17. Finger 34C contacts the carrying surface and another side edge of the cleat 17.

The shaft 22 is rotatably mounted in proximity to the conveyor belt 12. Preferably, each disk 24 is secured to the shaft 22 so as to substantially prevent longitudinal displacement of the disk along the shaft, which could otherwise allow adjacent disks to bunch together and leave gaps in the column of disks. In addition, each disk 24 is preferably secured to the shaft 22 to substantially prevent rotation of the disk relative to the shaft. If the disks 24 are permitted to rotate relative to the shaft, disks may be prone to slippage, which may hamper the cleaning process. The disks 24 may be secured to the shaft 22 using any appropriate means known in the art. For example, the inner diameter of the bore 21 in each disk 24 may be more or less equal to the exterior diameter of the shaft 22 so as to form an interference or friction fit that secures the disk on the shaft. Alternatively, each disk 24 may be attached to the shaft by a set screw disposed through the hub 26 to secure the disk to the shaft 22.

Figure 8:
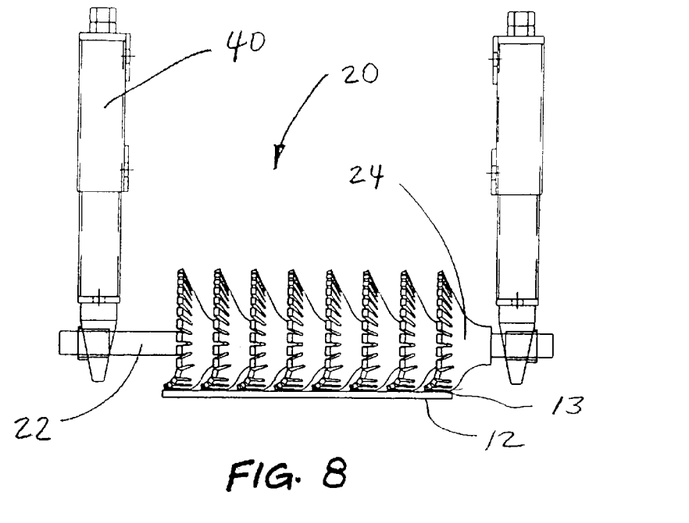
FIG. 8 is an inverted elevational view of the cleaning mechanism of FIG. 1, taken along in accordance with line 8—8 of FIG. 1, and showing the attachment of the shaft supporting the disks to an adjusting mechanism.

The thickness and texture of the residue of material may vary on a conveyor belt, depending on the material conveyed. These properties of the residual material may affect the cleaning operation. When a relatively thick layer of residual material accumulates on the belt surface 13, the position of the cleaning disks 24 relative to the belt 12 may need to be adjusted. Therefore, the cleaning mechanism 20 preferably includes an adjustment mechanism to adjust the position of the shaft and the engagement between the disks and the belt. FIG. 8 shows a shaft 22 connected to an adjustment mechanism 40 configured to adjust the degree of engagement between the cleaning disks 24 and the belt surface 13. The adjustment mechanism 40 may be any suitable device known in the art, such as an outboard bearing and tensioning device operable to adjust the resistance force that maintains the disks in engagement with the belt surface 13.

Figure 9:
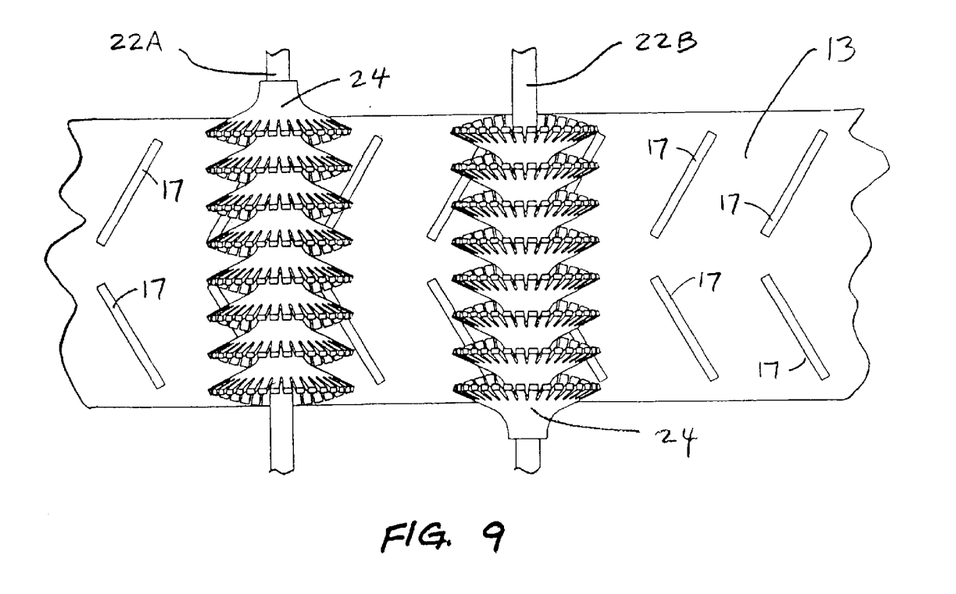
FIG. 9 is an enlarged bottom perspective view of the cleaning mechanism of FIG. 1.

One skilled in the art will appreciate that the cleaning disks 24 may be arranged in a variety of configurations. For example, conveyor belts that accumulate a large amount of residual material may require multiple shafts 22 containing cleaning disks 24 to remove the residue. The configuration of cleaning disks may also be chosen to address operational problems. Occasionally, belt cleaners, such as the cleaning mechanism 20 of the present invention, may cause a conveyor belt to thrust or misalign to one side as the belt engages the belt cleaner. To minimize belt thrust, multiple shafts 22 may be used in the cleaning arrangement conveyor belt, with the orientation of disks 24 alternated between adjacent shafts. FIG. 9 shows the cleaning mechanism with two shafts, 22A and 22B, with each shaft containing a series of cleaning disks 24. The disks 24 on shaft 22A are oriented with their peripheral edges facing one direction, and the disks on adjacent shaft 22B are oriented with peripheral edges facing the opposite direction. By alternating the orientation of the disks 24 on the adjacent shafts 22A, 22B, any thrust imparted to the belt 12 by the disks on shaft 22A is offset by the thrust imparted to the belt by the disks on shaft 22B.

It should also be appreciated that the disks may be made with many different configurations in the outwardly extending portions. It is preferable to have the fingers on the outwardly extending portion directed to contact the belt at an oblique angle, so that the fingers flex on contacting the belt under pressure. The central portion of the disk may be solid and made of metallic material with the outer portion of the periphery of rubber or elastomeric material attached to the outer surface of the metallic material, for example, in a groove in the metallic material or by other conventional means of attachment. The disks as shown in FIGS. 6 and 7 are one piece for ease of manufacture and assembly on the shaft.

The cleaning assembly 20 operates with the conveyor belt system 10 as follows. The chevron conveyor belt 12 passes over the head pulley 14 and discharges material at the discharge location 15. The belt 12 subsequently passes the cleaning mechanism 20. As the belt surface 13 travels past the cleaning mechanism 20, the fingers of the cleaning disks 24 are deflected by the belt surface, with deflected sections 25 of the disks frictionally engaging the belt surface. The resiliency of the flexible fingers 34 maintains the fingers on the belt surface 13 and the cleats 17, such that a substantial portion of the deflected disk sections 25 contact the belt surface and cleats.

The resilient fingers 34 conformingly engage the belt surface 13 and surround the cleats 17, as shown in FIG. 5. The disks 24 and shaft 22 rotate in response to the frictional engagement between the belt and the disks. The fingers 34 sweep across the belt surface and around the cleats to remove residual material adhering to the belt. Moist residue on the belt surface 13 and cleats 17 may cling to the flexible fingers and the underside of the disk as the disks engage the belt 12. Drier residue that adheres to the belt may be loosened by the cleaning disks so that the residue material falls from the belt by gravitational forces. The frictional engagement between the disks and the belt provides a scouring function that loosens dry or wet residual material adhering to the belt. When the belt contacting portion of the disks rotate out of engagement with the belt, the deflected sections of the disks and the deflected flexible fingers return to the original bowl-shape configuration under the resiliency of the disk material.

The terms and expressions which have been employed are used as terms of description and not of limitation. There is no intention in the use of such terms and expressions of excluding any equivalents of the features shown and described or portions thereof. It is recognized, therefore, that various modifications are possible within the scope and spirit of the invention. Accordingly, the invention incorporates variations that fall within the scope of the following claims.

I claim:

1. A conveyor belt assembly with a cleaning mechanism comprising:
    a moving conveyor belt having a carrying surface;
    a plurality of raised projections extending from the carrying surface;
    a rotatable shaft having a first end and a second end; and
    a plurality of disks mounted on the rotatable shaft and configured to rotate on the shaft, each disk having a plurality of flexible fingers extending radially outwardly from the perimeter of the disk,
    wherein said rotatable shaft is disposed in proximity to the moving conveyor belt such that the flexible fingers of each disk engage the belt, the flexible fingers engaging the belt being adapted to deflect in response to contact with the raised projections, so that the fingers engage around the raised projections.

2. The conveyor belt assembly of claim 1, wherein the disks are generally outwardly flared from an orientation along the shaft.

3. The conveyor belt assembly of claim 1, wherein each disk extends generally outwardly from an orientation on a surface of the shaft to engage the belt at an angle to flex the fingers.

4. A cleaning mechanism for a moving conveyor belt having a plurality of raised projections comprising:
    a first rotatable shaft having a first end and a second end;
    a plurality of disks mounted on the rotatable shaft and configured to rotate on the shaft; each disk having a plurality of flexible fingers extending radially outwardly from the perimeter of the disk,
    wherein said rotatable shaft is disposed in proximity to the moving conveyor belt such that flexible fingers of each disk engage the belt, the flexible fingers engaging the belt being adapted to deflect in response to contact with the raised projections, so that the fingers engage around the raised projections.

5. The cleaning mechanism of claim 4, wherein the disks are generally outwardly flared from an orientation along the shaft.

6. The cleaning mechanism of claim 4, wherein each resilient disk extends outwardly from an orientation on the shaft to engage the belt at an angle to flex the fingers.

7. The cleaning mechanism of claim 4 further comprising a second rotatable shaft having a first end and a second end, a second plurality of disks mounted on the second rotatable shaft and configured to rotate on the shaft; each disk having a plurality of flexible fingers extending radially outwardly from the perimeter of the disk, wherein the second plurality of disks are oriented on the second shaft in an opposite orientation from the disks on the first shaft to contact the conveyor belt at a different angle.

8. The cleaning mechanism of claim 1 or 7 in which the disk and fingers are integrally formed of the same material.

9. An article for use in cleaning a surface of a conveyor belt, comprising a disk having a perimeter and a plurality of flexible fingers extending generally outwardly around the perimeter, said fingers being configured to individually deflect in response to contact with the surface of the conveyor belt.

10. The article of claim 9 in which the disk and fingers are integrally formed of the same resilient material.

11. An article for use in cleaning a surface of a conveyor belt having raised projections, comprising a disk having a perimeter and a plurality of flexible fingers extending generally outwardly around the perimeter in a concave arrangement, said fingers being configured to individually deflect in response to contact with the raised projections of the conveyor belt to enable engagement around the raised projections.

12. The article of claim 11 in which the disk and fingers are integrally formed of the same resilient material.

13. A conveyor belt assembly with a cleaning mechanism comprising:
    a moving conveyor belt having a carrying surface;
    a plurality of raised projections extending from the carrying surface; shaft disposed in proximity to the belt; and
    a plurality of flexible fingers extending radially outwardly from the shaft in a series of concave configurations along the axis of the shaft.

14. The conveyor belt assembly of claim 13, wherein the flexible fingers extend outwardly from the shaft toward the belt to engage the belt at an angle to flex the fingers.

15. A cleaning mechanism for a moving conveyor belt having a plurality of raised projections, said cleaning mechanism comprising:
    a first shaft disposed in proximity to the belt; and
    a plurality of flexible fingers extending radially outwardly from the shaft in a series of concave configurations along the axis of the shaft.

16. The cleaning mechanism of claim 15, wherein the flexible fingers extend outwardly from the first shaft toward the belt to engage the belt at an angle to flex the fingers.

17. The cleaning mechanism of claim 15 further comprising a second shaft mounted in proximity to the belt and a second plurality of flexible fingers extending radially outwardly from the second shaft in a series of concave configurations along the axis of the second shaft.

18. The cleaning mechanism of claim 17, wherein the concave configurations of the flexible fingers on the first shaft are oriented in an opposite direction from the flexible fingers on the second shaft, such that the fingers on the first shaft engage the belt at a different angle than the fingers on the second shaft.

19. An article for use in cleaning a surface of a conveyor belt, comprising an inner hub and a plurality of flexible projections extending radially outwardly from the hub in a concave arrangement.

20. The article for use in cleaning a surface of a conveyor belt of claim 19, wherein the hub comprises a cylindrical bore that extends through the hub to permit the article to be mounted on a shaft.

21. An article for use in cleaning a surface of a conveyor belt, comprising an inner hub and a plurality of flexible projections extending radially outwardly from the hub in a series of concave configurations.

22. The article for use in cleaning a surface of a conveyor belt of claim 21, wherein the hub comprises a cylindrical bore that extends through the hub to permit the article to be mounted on a shaft.

23. An article for use in cleaning a surface of a conveyor belt, comprising a disk having a series of intermittent radial slits provided around the periphery of the disk to form a plurality of resilient flexible fingers around the periphery of the disk, the fingers being configured to individually deflect in response to contact with the surface of the conveyor belt.

24. The article of claim 23 in which the fingers are generally formed to deflect in a flat orientation on contacting the conveyor belt.

25. The article of claim 23 in which the fingers are formed to be individually displaced on the disk to conformingly engage the surface of the conveyor belt.

26. The article of claim 25 in which the conveyor belt has raised projections and the fingers are formed to deflect and engage around the raised projections of the conveyor belt.

27. The article of claim 25 in which the fingers of the disk are oriented to contact the belt at an oblique angle so that the fingers are adapted to flex on contacting the belt under pressure.

28. The article of any one of claims 23–27 in which the fingers are formed of an elastomeric material.

* * * * *